United States Patent
Haas

(10) Patent No.: US 8,231,425 B1
(45) Date of Patent: Jul. 31, 2012

(54) TOY CONSTRUCTION SET AND METHOD

(76) Inventor: James Haas, Bridgewater, NJ (US)

(*) Notice: Subject to any disclaimer, the term of this patent is extended or adjusted under 35 U.S.C. 154(b) by 0 days.

(21) Appl. No.: 13/242,473

(22) Filed: Sep. 23, 2011

Related U.S. Application Data

(60) Division of application No. 12/358,630, filed on Jan. 23, 2009, now Pat. No. 8,047,890, which is a continuation-in-part of application No. 10/772,662, filed on Feb. 5, 2004, now abandoned.

(51) Int. Cl.
*A63H 33/08* (2006.01)

(52) U.S. Cl. .............. 446/124; 446/86; 446/98; 403/1; 24/442; 24/710.5

(58) Field of Classification Search ............ 446/85–128; 24/710.5, 442, 447; 403/43–45, 1; 271/18.3
See application file for complete search history.

(56) References Cited

U.S. PATENT DOCUMENTS

| | | | |
|---|---|---|---|
| 226,453 A | 4/1880 | Kelly | |
| 1,412,970 A * | 4/1922 | Salfisberg | ........................ 24/356 |
| 2,033,039 A | 3/1936 | Limpert | |
| 2,205,550 A | 6/1940 | Wehr | |
| 2,354,810 A | 8/1944 | Haas et al. | |
| 2,407,879 A | 9/1946 | Haas | |
| 2,668,304 A | 2/1954 | Murray | |
| 2,809,067 A | 10/1957 | Macchi | |
| 3,031,730 A * | 5/1962 | Morin | .............................. 24/444 |
| 3,176,979 A | 4/1965 | Englemann | |
| 3,222,744 A | 12/1965 | Dellith | |
| 3,247,847 A * | 4/1966 | Mathison | ......................... 602/78 |
| 3,372,444 A | 3/1968 | Mathison | |
| 3,386,763 A | 6/1968 | Ottoway et al. | |
| 3,603,025 A * | 9/1971 | Heubl | .............................. 446/94 |
| 3,624,955 A * | 12/1971 | Matsubayshi | .................. 446/117 |
| 3,634,178 A | 1/1972 | Goodman | |
| 3,713,248 A | 1/1973 | Heubl | |
| 3,813,094 A | 5/1974 | Walton et al. | |
| 3,849,839 A | 11/1974 | Zimber | |
| 3,851,357 A | 12/1974 | Ribich et al. | |
| 3,964,364 A | 6/1976 | Poe | |
| 4,003,549 A | 1/1977 | Sergerie | |
| 4,007,516 A | 2/1977 | Coules | |
| 4,009,786 A | 3/1977 | Littlewood | |
| 4,165,811 A | 8/1979 | Mainvielle | |

(Continued)

FOREIGN PATENT DOCUMENTS

EP 0047102 A1 3/1982

*Primary Examiner* — Gene Kim
*Assistant Examiner* — Matthew B Stanczak
(74) *Attorney, Agent, or Firm* — Thomas L. Adams

(57) ABSTRACT

A toy construction set has interconnectable objects, each with multiple faces. Some faces have a connector, while others lack a connector but may have a fibrous or pierceable material. The connector includes a pair of concentrically nested hubs. The two hubs have spiral prongs that spiral in opposite directions. A manually operable link connected between the two hubs can relatively rotate them in opposite directions. The play activity proceeds by adjoining a pair of the objects with a prominent, connector-bearing face of one of the pair touching a prominent connector-free face of the other one of the pair. The player will counter-rotate the hubs in the connector of the prominent connector-bearing face to embed their spiral prongs in the fibrous or pierceable material of the prominent connector-free face.

3 Claims, 4 Drawing Sheets

U.S. PATENT DOCUMENTS

| | | | |
|---|---|---|---|
| 4,308,646 A | 1/1982 | Schenk | |
| 4,338,836 A | 7/1982 | Kuchler | |
| 4,474,489 A | 10/1984 | Simon | |
| 4,498,827 A | 2/1985 | Mair | |
| 4,505,468 A | 3/1985 | Heisler | |
| 4,518,277 A | 5/1985 | Bush et al. | |
| 4,526,363 A | 7/1985 | Fort | |
| 4,532,622 A | 7/1985 | Newbold | |
| 4,605,216 A | 8/1986 | DeWitt et al. | |
| 4,641,826 A | 2/1987 | van der Weide | |
| 4,645,193 A | 2/1987 | Walton et al. | |
| 4,705,442 A | 11/1987 | Fucci | |
| 4,711,596 A | 12/1987 | Bruderer | |
| 4,761,027 A | 8/1988 | Gehrig | |
| 4,802,939 A | 2/1989 | Billarant et al. | |
| 5,000,713 A * | 3/1991 | Cheng | 446/120 |
| 5,007,616 A | 4/1991 | Scarpino | |
| 5,058,245 A | 10/1991 | Saito | |
| 5,133,617 A | 7/1992 | Sokn et al. | |
| 5,384,939 A | 1/1995 | Weber | |
| D367,438 S | 2/1996 | Schriever | |
| 5,496,021 A | 3/1996 | Bellio et al. | |
| D374,609 S | 10/1996 | Akeno | |
| 5,603,145 A * | 2/1997 | Arakawa et al. | 24/442 |
| 5,624,167 A | 4/1997 | Katz | |
| 5,645,464 A | 7/1997 | Chen | |
| 5,651,570 A | 7/1997 | Schrum et al. | |
| 5,720,646 A | 2/1998 | Shannon et al. | |
| 5,728,116 A | 3/1998 | Rosenman | |
| 5,848,926 A | 12/1998 | Jardetzky et al. | |
| 5,873,379 A | 2/1999 | Bouix | |
| 5,899,621 A | 5/1999 | Wang | |
| 5,964,634 A | 10/1999 | Chang | |
| 6,123,035 A | 9/2000 | Pfister | |
| 6,296,656 B1 | 10/2001 | Bolduc et al. | |
| 6,336,766 B1 | 1/2002 | De Villele | |
| 6,468,309 B1 | 10/2002 | Lieberman | |
| 6,494,657 B2 | 12/2002 | Unsworth et al. | |
| 6,520,464 B1 | 2/2003 | Morrissey et al. | |
| 6,595,825 B1 | 7/2003 | De Wilde | |
| 6,616,369 B2 | 9/2003 | Clark | |
| 6,726,421 B2 | 4/2004 | Giannakakos et al. | |
| 6,726,422 B2 | 4/2004 | Giannakakos et al. | |
| 6,735,819 B2 | 5/2004 | Iverson et al. | |
| 7,100,854 B2 | 9/2006 | Aby-Eva et al. | |
| 2003/0041422 A1 | 3/2003 | Filion et al. | |
| 2004/0069980 A1 | 4/2004 | Shannon | |
| 2005/0170739 A1 * | 8/2005 | Zoellner | 446/92 |
| 2005/0235462 A1 | 10/2005 | Takahashi et al. | |
| 2005/0241119 A1 | 11/2005 | Efremova et al. | |
| 2008/0229556 A1 | 9/2008 | Hammer | |

\* cited by examiner

TOY CONSTRUCTION SET AND METHOD

CROSS-REFERENCES TO RELATED APPLICATIONS

This application is a divisional of U.S. patent application Ser. No. 12/358,630, filed Jan. 23, 2009, which is a continuation in part of U.S. patent application Ser. No. 10/772,662, filed Feb. 5, 2004, the contents of which are hereby incorporated by reference herein.

BACKGROUND OF THE INVENTION

1. Field of the Invention

The present invention relates to toys, and in particular, to construction sets allowing a player to interconnect play objects.

2. Description of Related Art

Toy constructions sets have been popular for generations. Early Erector™ sets used stamped metal struts that could be bolted together to build various constructions. However, using nuts and bolts requires significant manual dexterity and such small parts present a swallowing risk to small children.

More recent Lego™ construction sets employ rectangular blocks that connect by snapping the lower edges of a block down around cylindrical studs atop an underlying block. Such an arrangement is easy to assemble but the block to block strength is relatively small. In addition, the blocks interconnect in only a small number of ways and the position of a block cannot be finely adjusted relative to another block.

Hook and loop fasteners have been used to interconnect objects. While such fasteners interconnect with relatively little effort, disconnecting them can require some strength. Small children may not have the strength needed to disconnect such fasteners if they are used in toys.

Other known playsets include a number of pieces that can be mixed and matched to produce different figures. For example, the set can have a number of different items representing different faces, hairstyles, upper torsos, hips and legs, shirts, pants, skirts, shoes, fashion accessories, etc. A child can select different elements to compose a custom figure. These elements are often thin panels intended to create a two dimensional image.

See also U.S. Patent Application Publication No. 2004/0069980 and the following U.S. Pat. Nos. D367,438; D374,609; 226,453; 2,033,039; 2,205,550; 2,354,810; 2,407,879; 2,668,304; 2,809,067; 3,176,979; 3,222,744; 3,386,763; 3,634,178; 3,813,094; 3,849,839; 3,964,364; 4,003,549; 4,009,786 4,007,516; 4,165,811; 4,308,646; 4,338,836; 4,498,827; 4,505,468; 4,518,277; 4,526,363; 4,605,216; 4,641,826; 4,645,193; 4,705,442; 4,761,027; 5,007,616; 5,496,021; 5,624,110; 5,624,167; 5,728,116; 6,296,656; 6,468,309; 6,494,657; 6,520,464; 4,474,489; 4,532,622; 4,711,596; 5,133,617; 5,651,570; 5,873,379; 5,899,621; 6,123,035; 6,336,766; 6,616,369; 6,726,421; 6,726,422; and 7,100,854.

SUMMARY OF THE INVENTION

In accordance with the illustrative embodiments demonstrating features and advantages of the present invention, there is provided a toy construction set including a plurality of interconnectable objects each having a plurality of faces. Some of the plurality of faces have a connector, while other ones of the plurality of faces lack a connector but have a fibrous or pierceable material. The connector has a first hub and a second hub. Each of the hubs has on one side thereof a plurality of spiral prongs. The spiral prongs on the first hub spiral in a direction opposite that of the spiral prongs on the second hub. The connector also has a manually operable link connected between the first and the second hub for relatively rotating them in opposite directions.

In accordance with another aspect of the invention a method is provided for playing with multi-faceted objects each having connectors on some of its faces and on other of its faces fibrous or pierceable material. The connector has concentrically nested hubs with oppositely spiraling prongs. The method includes the step of adjoining a pair of the objects with a prominent connector-bearing face of one of the pair touching a prominent connector-free face of the other one of the pair. Another step is counter-rotating the hubs in the connector of the prominent connector-bearing face to embed their spiral prongs in the fibrous or pierceable material of the prominent connector-free face.

In accordance with yet another aspect of the invention there is provided a toy construction set having a plurality of interconnectable objects each with a plurality of faces. The plurality of objects each has a connector on three of the faces that are orthogonal. Other ones of the plurality of faces that lack a connector have a fibrous or pierceable material. The connector includes a first hub and a second hub. Each of the hubs has on one side thereof a plurality of spiral prongs arranged in at least one circular row. The spiral prongs on the first hub spiral in a direction opposite that of the spiral prongs on the second hub to provide a right and a left hand thread. Each of the spiral prongs rise less than its overall exposed length. The first hub is rotatably attached to a corresponding one of the faces of the object. The second hub is annular. The first hub has a circular outline and is concentrically and rotatably mounted in the second hub. The connector has a manually operable lever pivotally connected between the first and the second hub for relatively rotating them in opposite directions at most 1/16 of a turn. The link extends outside the second hub. The set includes a substrate with a fibrous or pierceable material. The connector is adapted to connect to the substrate.

By employing apparatus and methods of the foregoing type, an improved construction set and play method is achieved. In one embodiment cubic blocks can have some of their faces fitted with connectors. In the disclosed embodiment, the cubic blocks have three connectors on three different orthogonal faces.

Each connector has a central hub concentrically and rotatably mounted inside an annular hub. Both hubs can rotate relative to each other and to the play object. Both hubs support outwardly projecting spiral prongs. The prongs on one hub spiral in the opposite direction of the prongs on the other hub. The three other faces of the disclosed block lack connectors but present fibrous or other material that is penetrable by prongs on the connectors.

The spiral prongs on the hubs may be considered helical, with one set presenting a right handed thread and the other a left handed thread. These prongs may be relatively short and in many embodiments will be less than 1/16 of a turn, although the turning angle will vary with the size of the hub holding the prong.

Because of their relative shortness, the manufacturing of the prongs can be simplified. Specifically, the prongs may be made to follow the arc of a circle, that is, each prong may lie along a plane and need not follow the three dimensional path of a true helix. In a disclosed embodiment, each prong lies in a relatively shallow plane, for example, a plane with an angle of elevation of about 30°.

The two hubs may rotate relative to each other by manually operating a link. The link may be a lever that is pivotally connected to both hubs. The lever extends outwardly beyond the annular hub to allow a player to swing the lever.

A connector designed in this manner can be very easily operated. A user need only place a connector on one of the faces of a play object against the penetrable material on one of the connectorless faces of another play object. Then the player will operate the link lever to relatively rotate the two hubs and their prongs. The two sets of prongs spiral into the opposing material in opposite directions.

With this arrangement a player can connect blocks to form structures of the player's choosing. The blocks can be placed face to face and then connected. The blocks can face each other squarely or can be laterally offset by some player-selected distance. Also, the blocks can be angularly displaced by relatively rotating them through a player-selected angular offset. The foregoing gives a player much freedom in designing and adjusting the structure.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE PREFERRED EMBODIMENTS

Figure 1:
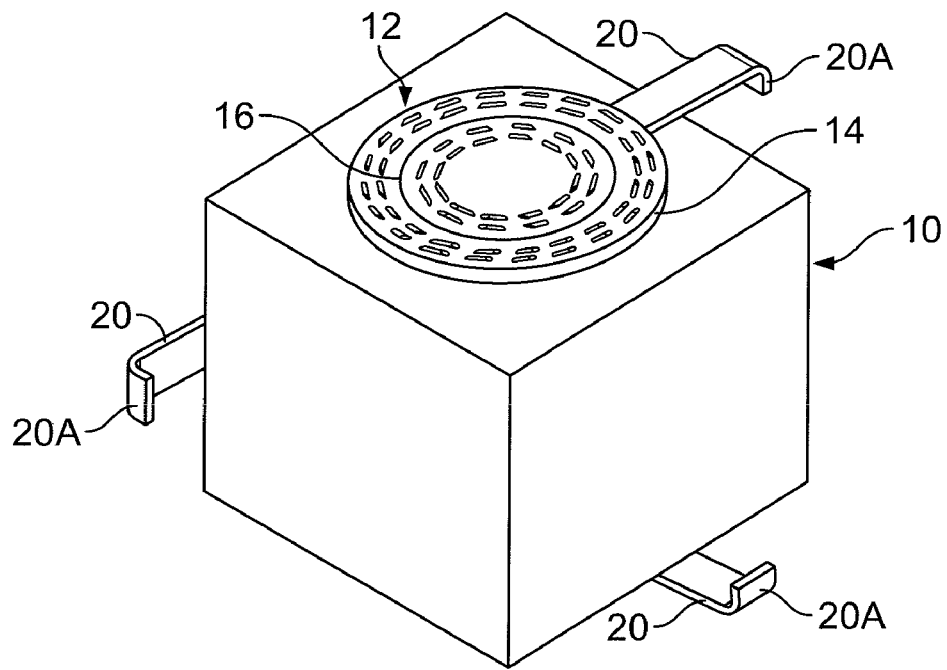
FIG. 1 is a perspective view in of a play object in accordance with principles of the present invention.
Figure 2:
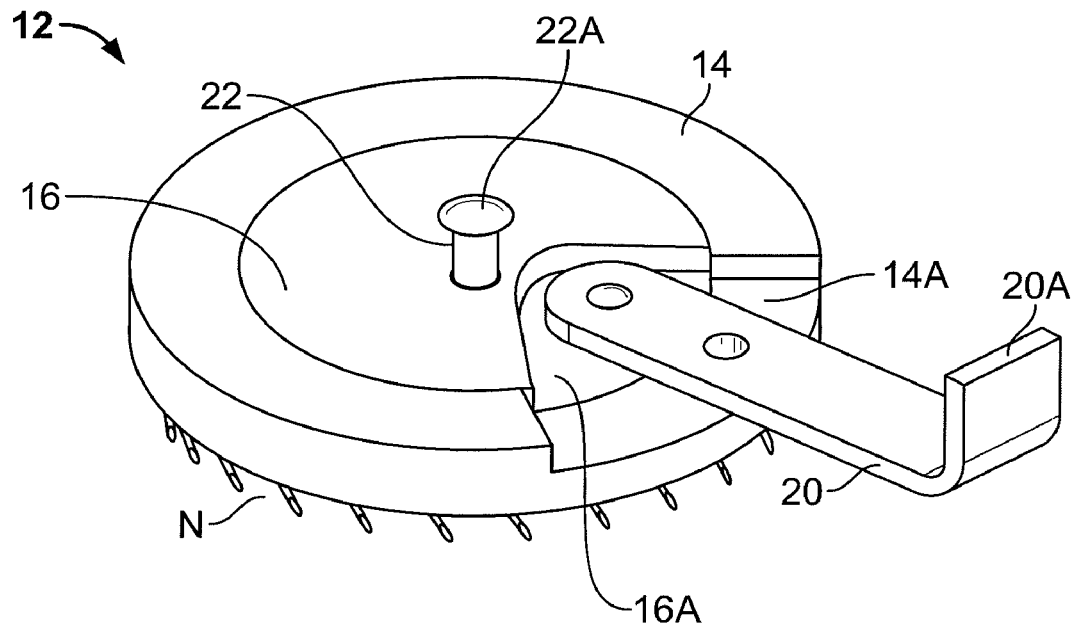
FIG. 2 is a perspective view of the connector on the object of FIG. 1.
Figure 3:
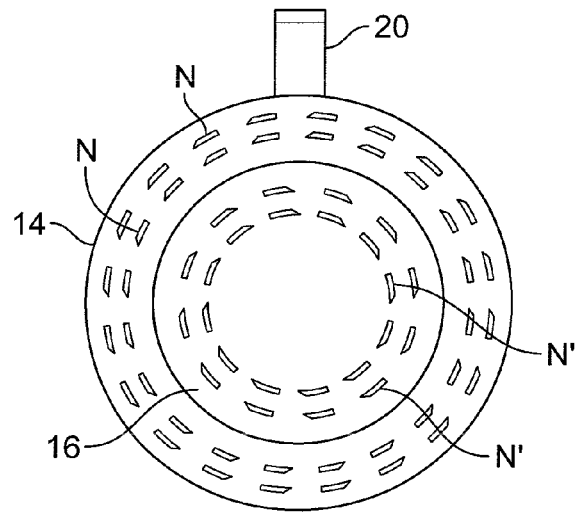
FIG. 3 is a plan view of the outside of the connector of FIG. 2.

Referring to FIGS. 1-3, an interconnectable play object is shown as a plastic cube with a connector 12 on three of its six faces. In this view the three connectors 12 are on a top face, a bottom face, and one of the four side faces. Alternatively, connector 12 can be placed on a top face and two side faces that can be either opposite or adjacent. In each case the connector-bearing faces of play object 10 are mutually non-parallel and orthogonal.

Instead of being cubic, object 10 can have another multi-faceted parallelepiped or polyhedral shape, arranged to have maximum symmetry, little symmetry or no symmetry. In other embodiments the object may have curved faces, e.g., a cylinder, a sphere, an ovoid, a paraboloid, a cone, a surface of revolution, a section of one of the foregoing, or some other arbitrary shape.

In some cases the objects may have a shape representing one of a class of objects. For example, for constructing a miniature building the objects may be shaped to represent a window, door, chimney, roof, gable, etc. In another example, the objects may represent human or non-human anatomical components such as an arm, leg, head, torso, hand, paw, tail, hair, eyes, ears, etc. The latter example may also include clothing and accessories such as shirts, skirts, dresses, pants, hats, shoes, handbag, suitcase, etc.

For practical embodiments at least two faces of the object will bear a connector and the other faces will not. In particular, most embodiments will have at most three of the faces bearing a connector.

The connectorless faces will present a fibrous material or other material that can be penetrated by spiral prongs N and N' of connector 12. Such penetrable material of the connectorless faces may be a knitted or woven fabric, a felt layer, a pile or carpet-like layer, or other fibrous material. In other cases the object itself may be made of a penetrable material such as a sponge-like substance, clay, polystyrene foam, a soft plastic, an elastomer, etc. In still other embodiments the object may have an external mesh or grid with sufficient underlying clearance to accept prongs N and N'. For example, the object can be an open frame covered with plastic screening much like the screening used in windows and doors. It will be appreciated that such penetrable material may appear only on connectorless faces, or may appear on every face but will be overlaid with a connector 12 on some faces.

Connector 12 has a central first hub 16 encircled by an annular, second hub 14. Annular hub 14 may have essentially cylindrical inside and outside circumferences, while hub 16 may be essentially a cylinder with a circular outline. Alternatively, the interfacing surfaces of hubs 14 and 16 may be joined by an annular bead that snaps into an annular groove. Hubs 14 and 16 may be made from plastic, metal, ceramic, wood, or other materials.

Hub 14 has a pair of radially aligned steps that descend onto opposite ends of recess 14A. Hub 16 has a wedge-shaped recess 16A having approximately the same angular compass as recess 14A. Recesses 14A and 16A provide clearance for manually operable link 20, shown as a flat blade with straight edges, a rounded proximal end, and a distal end with transverse tab 20A.

Link 20 is pivotally connected at its proximal end to hub 16 near the inside corner of recess 16A. Link 20 is also pivotally connected to hub 14 at the center of recess 14A. Link 20 extends to the outside of hub 14 and by manipulating its distal tab 20A can act as a manually operable lever. Using hub 16 as a frame of reference, if link 20 is rotated clockwise (counterclockwise) hub 14 will rotate clockwise (counterclockwise).

In most embodiments hubs 14 and 16 will both counter-rotate concentrically and relative to object 10. Accordingly, axle 22 extends along the axis of hub 16 and ends in a ball 22A that will snap into a socket (not shown) in object 10 to allow rotation of hub 16 relative to object 10.

Hubs 14 and 16 have a plurality of spiral prongs N and N', respectively. Prongs N are arranged in two circular concentric rows of twenty prongs each, that is, forty altogether on hub 14. Prongs N' are arranged in two circular concentric rows of twelve prongs each, that is, twenty-four altogether on hub 16. Prongs N' are shaped and distributed in the same way, except for being a mirror image of the arrangement of prongs N.

Figure 5:
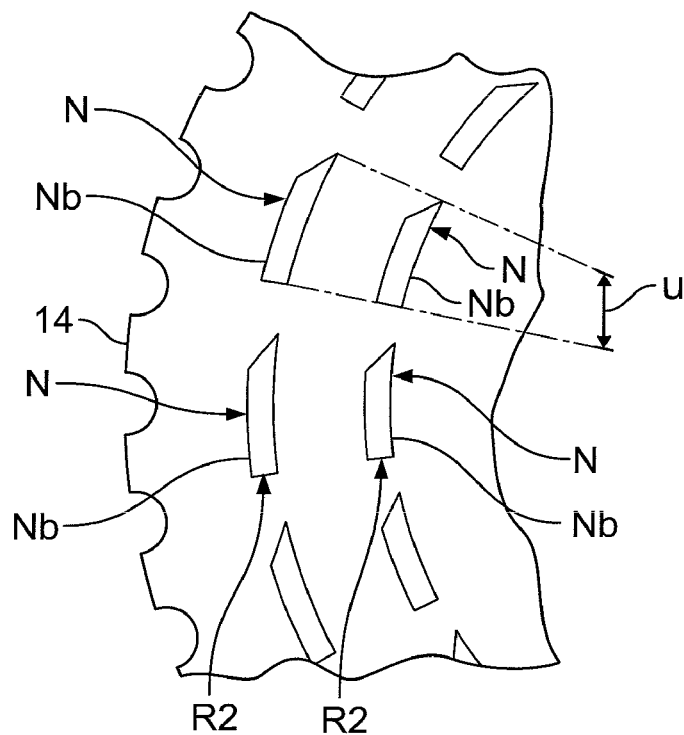
FIG. 5 is a fragmentary, bottom view of one of the hubs and prongs of FIG. 3.
Figure 6:
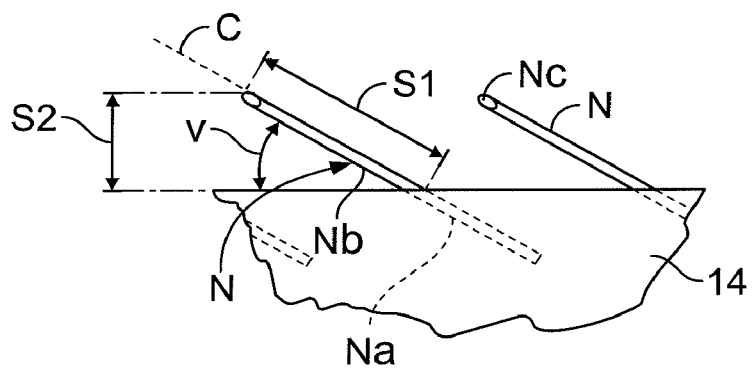
FIG. 6 is a fragmentary side view of the hub and prongs of FIG. 5.

Referring to FIGS. 5 and 6, prongs N are shown arranged into concentric circular rows identified as an outside row R1 and an inside row R2. A portion of the outside row is illustrated by itself in FIG. 6. Each prong N has a portion Na embedded in hub 14 to support an exposed portion Nb having an overall exposed length s1. Portion Na may be embedded by being molded in place. While distinct embedded prongs are illustrated, in some embodiments the prong will be a feature molded upon the face of the hub.

In this embodiment prongs N have a circular cross-section and their distal tips may be sharpened by being ground at an angle to produce an elliptical feature Nc. However, different cross-sections are contemplated and sharpening is optional. In fact, to protect children from injury, the distal tips may be rounded to eliminate any sharp edges.

Embedded prong portion Na is straight and lies in an upright reference plane that is parallel to the axis of hub 14 and tangent to the circle defining the prong row (in FIG. 6 row R1). This point of tangency is defined at the transition between portion Na and portion Nb. Both portions Na and Nb lie in a canted plane C that is perpendicular to the reference plane. This canted plane C intersects the axis and the surface of hub 14 at angle v, which defines the angle of elevation of prong N.

The exposed portion Nb of prong N is shown curved in FIG. 5, which is a plan view and therefore essentially a projection of prongs N onto the surface of hub 14. Prongs N are shown there following circular paths associated with their respective rows R1 and R2; although strictly speaking, to project onto a circle, prong portion Nb would follow an elliptical path in canted plane C. While exposed portion Nb can follow such an elliptical path to project the ideal circular path, as a practical matter there is almost no significant difference between bending the portion Nb into this elliptical path or approximating the elliptical path with a circular bend. This follows from the fact that prong portion Nb follows a relatively small turning arc u of about 15°. In particular, since there are twenty prongs N per row, the prong to prong spacing is 18°.

Figure 7:
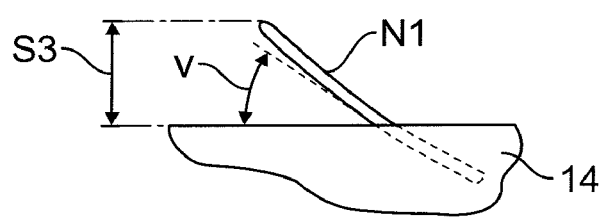
FIG. 7 is a fragmentary side view of a hub and prongs that is an alternate to that of FIG. 6.

Ideally, the exposed portions of the prongs will follow a helical path and therefore will not lie on a plane. FIG. 7 shows a prong N1 whose exposed portion follows such a helical path. A line tangent to such a path can be set to have the same angle of elevation v as before, but, being helical, the path will rise faster and reach a greater height s3 for the same turning arc.

Referring again to FIG. 6, prongs N should be thin enough and long enough to pierce and efficiently anchor to the target material. If the prongs are too thin they will tend to bend or break and will not effectively penetrate the target material and stay anchored thereto. Also, if the prongs are too long, they may require rotation through a greater angle, which will tend to slow the speed of penetration and increase the torque needed to penetrate. In addition, the angle of elevation v of prongs N should be steep enough to ensure that the prongs penetrate to a sufficient depth without skimming over the surface of the target material. On the other hand, an excessively steep angle of penetration will provide insufficient anchoring strength and the prongs will tend to slip out of the target material.

If play objects 10 are relatively large (say 25 cm or more) the faces with penetrable or fibrous material can be made with a covering of pile loop carpeting. If play objects 10 are of a modest size (around 10 cm) these faces can be covered with felt (about 6 mm thick, for example) or with a relatively thick fabric such as burlap. For relatively small play objects (say 5 cm or less) these faces can be covered with one or two layers of a relatively thin fabric such as linen. In some embodiments the penetrable material may be the loop fabric used in conventional hook and loop fasteners.

For prongs intended to anchor onto loop pile carpeting (e.g., carpet pile 3 mm deep with 4 mm loop circumference) an exposed prong length s1 of 0.25 to 0.35 inch (6.4 to 8.9 mm) at an angle of elevation of 30°±10° works satisfactorily. For the embodiment of FIG. 6 prong N will have a nominal rise s2 of 0.15 inch (3.8 mm). For the embodiment of FIG. 7 rise s3 will be nominally 0.19 inch (4.8 mm). For effective anchoring, the exposed length s1 will exceed the rise (rise s2 in FIG. 6 and rise s3 in FIG. 7). In one embodiment prongs N were made of steel piano wire, 0.033 inch (0.84 mm) in diameter. However, to reduce the risk of injury, prongs N and N' may be made of a plastic fiber that is stiff enough to penetrate the material of the opposing face.

It will be understood that the foregoing dimensions and materials can be varied depending upon the target material, desired anchoring strength, desired angle of rotation, strength of the prongs, etc. For penetrable material thinner than ordinary pile loop carpeting, prongs N and N' will typically be scaled down in proportion to the reduced thickness of the penetrable material. In general, the length, number, spacing, angle of elevation and other characteristics of prongs N and N' may be altered to accommodate different penetratable materials.

Also, if the prong-bearing hub will have a greater diameter, the number of prongs per row can be scaled up appropriately while keeping approximately the same prong length. So if, for example, the hub diameter is doubled in comparison to the foregoing embodiment, the number of prongs will be doubled as well for the same prong length.

Figure 4:
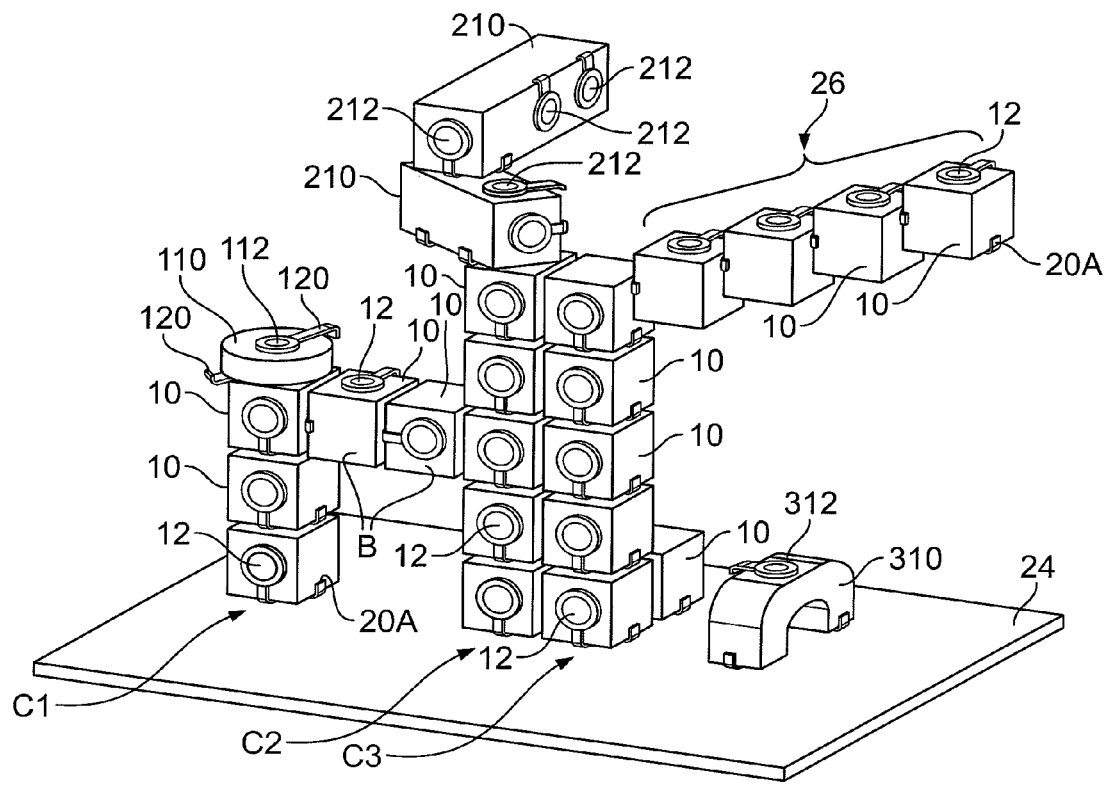
FIG. 4 is a perspective view of a play structure using a plurality of the objects shown in FIG. 1.

Referring to FIG. 4, the previously described play object 10 is shown built using twenty identical objects 10 to create a structure greater than any one object 10 (i.e. greater in height, width, or depth). In column C1 three blocks 10 are stacked squarely with their undersides having connectors 10 (only their tabs 20A being visible for the lower two). Objects 10 of column C1 also have connector 12 on the back (not visible) and on the front. Column C1 is placed on a substrate made of material similar to the previously mentioned penetrable material of the connectorless faces of object 10.

The lowest object 10 of column C1 is positioned as shown on substrate 24 and then tab 20A is pushed back to counter-rotate its hubs (hubs 14 and 16 of FIGS. 1-3). Essentially, each of the connector hubs (hubs 14 and 16 of FIG. 2) will rotate relative to its object 10 so that the object does not angularly shift by being fastened in place.

Consequently, prongs N and N' (FIG. 3) counter-rotate with hubs 14 and 16, respectively. Being helical, or approximately helical, prongs N and N' screw and anchor into the penetrable material on the connectorless face of object 10. In this embodiment hubs 14 and 16 rotate 15° or less, i.e. no more than the angle u of FIG. 5. Here the angle of rotation is no more than one-twenty fourth of a turn. To make an anchor quick-acting it is advantageous to have the angle of rotation at most one-sixteenth of a turn. It will be appreciated that the relative rotation between hubs 14 and 16 will be additive, that is, 30° or less. However as a practical matter, the relative rotation need not reach its full potential angular displacement to achieve satisfactory anchoring. In any event, prongs N and N' of the two hubs spiral into substrate 24 of FIG. 4 and lock in place.

The middle object 10 of column C1 is placed atop the lowest object as shown. As before tab 20A of middle object 10 is pushed back to allow the underlying prongs N and N' (not shown) to spiral into the penetrable material atop the lowest block 10. This process is repeated for the top object 10. In this specification an interconnecting or prominent face of an object is defined as one that (a) connects to a connector on an adjacent object, or (b) bears a connector that connects to either substrate 24 or a connectorless face of an adjacent object.

A cylindrical object 110 is placed at the top of column C1. Object 110 has on its circular top and bottom a connector 112 designed the same as connector 12. Connectors 112 have link levers 120 extending radially. The bottom connector of object 110 connects to the connectorless top of underlying object 10 in the manner just described for objects 10.

A bridge B may be formed with the two objects 10. The left object 10 of bridge B has a connector 12 to the right and left (not shown) in order to connect to the adjacent objects 10 in the manner previously described. The right object 10 of bridge B has a right connector 12 (not shown) that is connected to the connectorless face of adjacent object 10 before or after the erection of column C2, which is built and arranged the same as column C1 but with two additional objects 10.

Two objects 210 are connected to the top of the column C2. Objects 210 are twice as long as objects 10 but have the same height and depth. Objects 210 each have a pair of connectors 212 on top and a pair of connectors 212 on the bottom. Connectors 212 are identical to connectors 12. For each of the objects 210 a connector 212 is mounted on only one of the small faces.

The lower one of the objects 210 has only one of its two bottom connectors 212 connected to the top of the top object 10 of column C2. In this arrangement lower object 210 projects diagonally back and to the left from the top object 10 of column C2. In comparison to lower object 210, upper object 210 is rotated along its longitudinal axis 90° so one of its long connectorless faces can connect to a distal one of the connectors 212 atop the lower one of the objects 210. The longitudinal axis of the two objects 210 are displaced azimuthally 135°.

Column C3 has five objects 10 arranged and interconnected the same as column C2. With this arrangement columns C2 and C3 are unconnected. These two columns can be connected and reinforced by rotating one or more of the bottom four objects 10 in column C3 by 90° about a vertical axis to make some connectors 12 of column C3 face column C2.

Branch 26 is supported by the right connectorless face of the top object 10 of column C3. Branch 26 has four objects 10 with connectors 12 on top and bottom and to the left. The left connectors on objects 10 connect on the left to the adjacent object 10.

It will be appreciated that the position of connectors 12 can be finely adjusted since they may be positioned anywhere on the connectorless face of object 10. Taking advantage of this fact, objects 10 of branch 26 do not connect squarely but are offset diagonally to give the branch an upward and backward slant. In this embodiment the offset is even, but in other embodiments the offset can vary and may have an angular offset to lay a branch along an arbitrary three-dimensional path.

Another construction object 310 has an arched shape with a connector 310 atop the arch and two connector 310 (not shown) at the two feet of the arch. Connectors 310 are identical to connectors 10.

Figure 8:
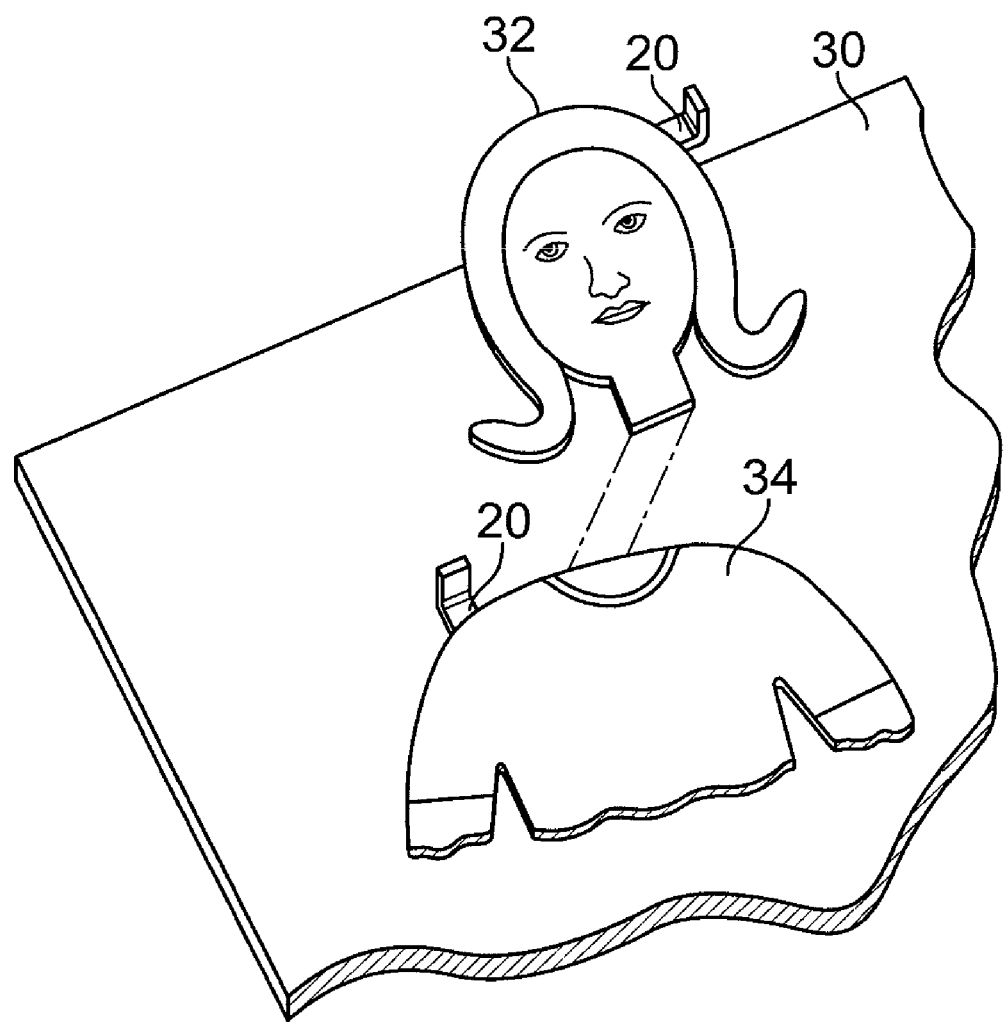
FIG. 8 is an perspective view of play objects that are an alternative to that shown in FIG. 4.

Referring to FIG. 8, substrate 30 may be made in a manner similar to substrate 24 of FIG. 4. In this embodiment a playset has a number of panels shaped to represent portions of a doll, two such portions 32 and 34 being illustrated here.

Specifically, piece 32 is a plastic panel having the outline of a doll's head and imprinted with facial features and hair features. In order to connect to substrate 30 piece 32 has on its back a connector identical to connector 12 of FIG. 1, with its link lever 20 being partially visible in this view. Piece 34 is a plastic panel with an outline of an upper torso and arms and imprinted to show a shirt. Again piece 34 has a rear connector 12 (only lever 20 visible) to connect to substrate 30.

Pieces 32 and 34 are part of a larger playset including multiple heads, torsos, legs, feet, hands, etc. A player can mix and match these components to custom design a figure. Some sets will segment the head into a hair and face panel. Also the body components can be varied with different garb and different body poses.

When disassembling the structure of FIG. 4, connectors 12 may be released by pushing lever 20 in the opposite direction (clockwise in FIG. 2) to rotate hub 14 clockwise relative to hub 16. Consequently, prongs N and N' will unscrew and object 10 may then be reused in different positions in different structures.

Obviously, many modifications and variations of the present invention are possible in light of the above teachings. It is therefore to be understood that within the scope of the appended claims, the invention may be practiced otherwise than as specifically described.

The invention claimed is:

1. A method for playing with multi-faceted objects each having connectors on some of its faces and on other of its faces fibrous or pierceable material, the connector having concentrically nested hubs with oppositely spiraling prongs, the method comprising the steps of:

adjoining a pair of the objects with a prominent connector-bearing face of one of the pair touching a prominent connector-free face of the other one of the pair; and counter-rotating the hubs in the connector of the prominent connector-bearing face to embed their spiral prongs in the fibrous or pierceable material of the prominent connector-free face.

2. A method according to claim 1 wherein the step of counter-rotating the hubs is performed by relatively rotating the hubs at most 1/16 of a turn.

3. A method according to claim 1 wherein the step of adjoining the objects is performed with more than a pair of the objects, said objects being adjoined to form a structure having a height, width or depth greater than any one of the objects.

* * * * *